US008197956B2

(12) United States Patent
Milner

(10) Patent No.: US 8,197,956 B2
(45) Date of Patent: Jun. 12, 2012

(54) FLEXIBLE BATTERY RESTRAINT FOR ELECTRONIC DEVICES

(75) Inventor: Chris Milner, Morehead City, NC (US)

(73) Assignee: Propel IP, LLC, Raleigh, NC (US)

( * ) Notice: Subject to any disclaimer, the term of this patent is extended or adjusted under 35 U.S.C. 154(b) by 562 days.

(21) Appl. No.: 12/416,349

(22) Filed: Apr. 1, 2009
(Under 37 CFR 1.47)

(65) Prior Publication Data
US 2010/0129702 A1    May 27, 2010

Related U.S. Application Data

(60) Provisional application No. 61/041,683, filed on Apr. 2, 2008.

(51) Int. Cl.
*H01M 2/02* (2006.01)

(52) U.S. Cl. .............................. 429/96; 429/99; 429/100

(58) Field of Classification Search ................. 429/96, 429/97, 98, 99, 100
See application file for complete search history.

(56) References Cited

U.S. PATENT DOCUMENTS
2009/0239134 A1* 9/2009 Tseng ........................... 429/100
* cited by examiner

*Primary Examiner* — Joseph Kosack
(74) *Attorney, Agent, or Firm* — Myers Bigel Sibley & Sajovec, P.A.

(57) ABSTRACT

A battery restraint apparatus for electronic devices includes a flexible, resilient substrate having opposite, elongated end portions. An elongated aperture is formed in the substrate adjacent each end portion. The substrate has elastic memory that allows it to be flexed and bent and to thereafter resiliently recover to its original shape. The battery restraint apparatus is configured to be removably secured to an electronic device and snugly overlie a battery compartment opening thereof.

10 Claims, 2 Drawing Sheets

FLEXIBLE BATTERY RESTRAINT FOR ELECTRONIC DEVICES

RELATED APPLICATION

This application claims the benefit of and priority to U.S. Provisional Patent Application No. 61/041,683, filed Apr. 2, 2008, the disclosure of which is incorporated herein by reference as if set forth in its entirety.

FIELD OF THE INVENTION

The present invention relates generally to restraint devices and, more particularly, to flexible restraint devices.

BACKGROUND OF THE INVENTION

Electronic devices, such as remote control devices for television sets and other electronic equipment, typically include a battery compartment containing batteries that power the devices. Conventionally, battery compartments include a removable door that allows a user to access the compartment and change batteries when necessary. Unfortunately, because of heavy use of such devices, it is fairly common for battery compartment doors to become damaged or lost. As a result, batteries within these devices can fall out and/or become dislodged such that electrical power is not supplied to the electronic devices. This can be a major annoyance to users of these devices. Unfortunately, replacement battery compartment doors may not be available for many electronic devices. In some cases, a replacement door is available only by purchasing a new device. This may be a costly solution for many users. As such, users often resort to the use of tape or other less desirable ways of repairing/replacing damaged or missing battery compartment doors of electronic devices.

SUMMARY

In view of the above discussion, a battery restraint apparatus for electronic devices is provided. According to some embodiments of the present invention, a battery restraint apparatus includes a flexible, resilient substrate having opposite, elongated end portions. An elongated aperture is formed in the substrate adjacent each end portion. Each elongated aperture extends along a direction that is substantially parallel with a respective end portion of the substrate. The substrate has elastic memory that allows it to be flexed and bent and to thereafter resiliently recover to its original shape. Exemplary elastomeric material from which the substrate may be formed includes natural polymeric materials and synthetic polymeric materials.

In some embodiments, the substrate has an hour-glass configuration.

In some embodiments, a surface of the substrate has a tactile configuration that facilitates gripping by a user.

In some embodiments, the substrate is a composite of two or more layers of flexible material. At least one of the two or more layers includes a resilient, deformable material.

In some embodiments, a surface of the substrate includes printed indicia thereon.

In some embodiments, the substrate includes phosphorescent material.

According to some embodiments of the present invention, an electronic device, such as a remote control for a television or other device, includes a housing; a battery compartment within the housing that has an opening in a surface of the housing; at least one battery disposed within the battery compartment; and a battery restraint apparatus removably secured to the housing and having a portion snugly overlying the battery compartment opening. The battery restraint apparatus includes a flexible substrate having opposite, elongated end portions with an elongated aperture formed in the substrate adjacent each end portion. The electronic device housing extends through the elongated apertures to retain the battery restraint apparatus thereon.

BRIEF DESCRIPTION OF THE DRAWINGS

The accompanying drawings, which form a part of the specification, illustrate embodiments of the present invention. The drawings and description together serve to fully explain the invention.

DETAILED DESCRIPTION

Figure 1:
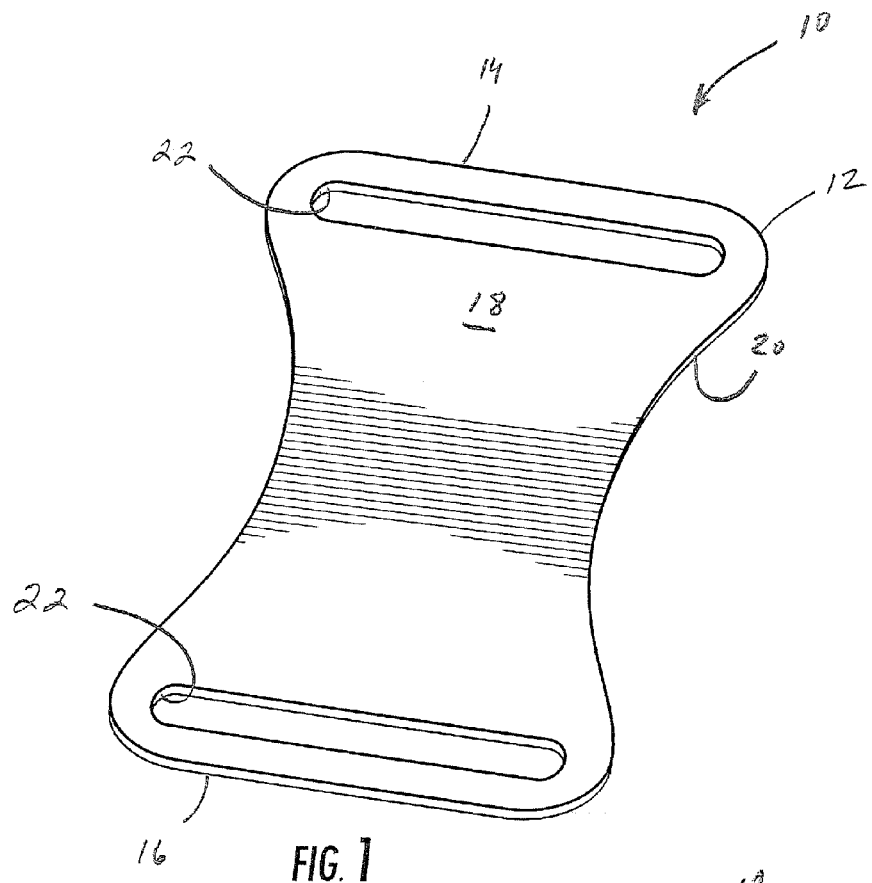
FIG. 1 is a perspective view of a flexible battery restraint for electronic devices, according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the drawings, the thickness of lines, layers and regions may be exaggerated for clarity. It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". A device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention.

Embodiments of the present invention provide a convenient and novel battery restraint for use with various types of electronic devices having damaged or missing battery compartment doors. Electronic devices that may utilize battery restraints, according to embodiments of the present invention, may be any type of device including, but not limited to, remote controls (e.g., remote control devices for televisions, radios/tuners, amplifiers, DVD devices, CD devices, etc.), calculators (e.g., medical calculator, finance calculator, etc.), personal data assistants (PDAs), laptop computers, etc. Accordingly, as used herein, the term "electronic device" means any type of electronic device that may include a battery compartment with a removable battery compartment door or access member.

Figure 2:
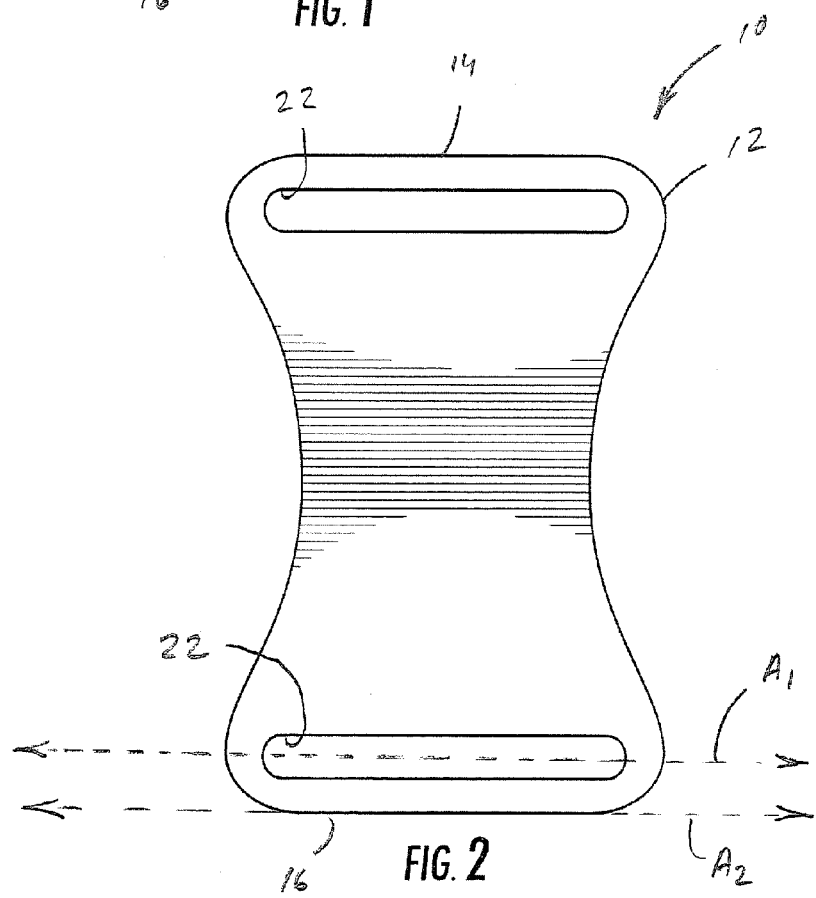
FIG. 2 is a plan view of the flexible battery restraint of FIG. 1.
Figure 3:
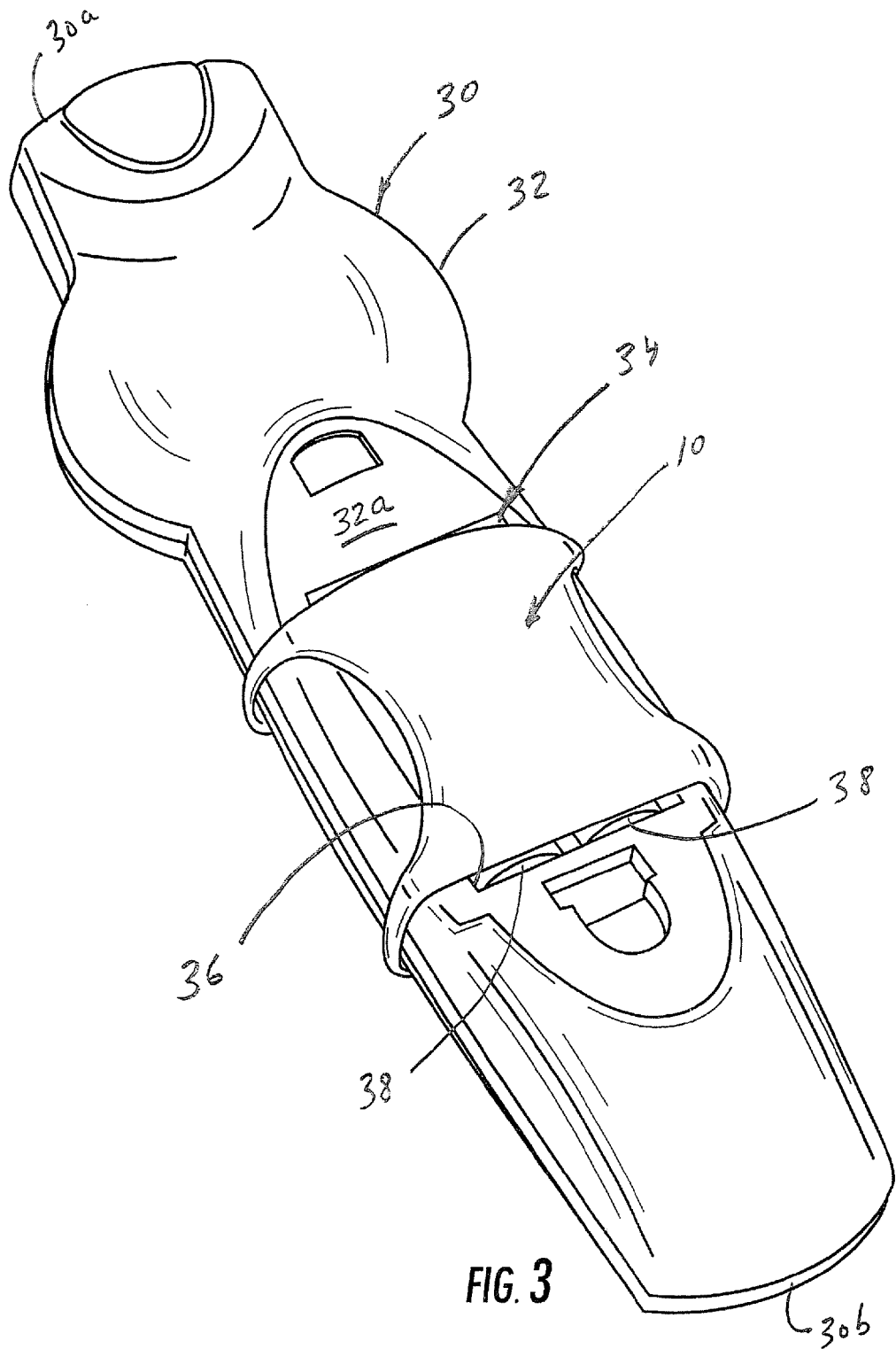
FIG. 3 is a perspective view of an electronic device with the flexible battery restraint of FIG. 1 installed so as to cover the battery compartment of the apparatus, according to embodiments of the present invention.

Referring to FIGS. 1-3, a battery restraint apparatus 10, according to some embodiments of the present invention, is illustrated. The illustrated battery restraint apparatus 10 comprises a flexible substrate 12 of resilient material having opposite, elongated end portions 14, 16 and opposite surfaces 18, 20. In some embodiments, the flexible substrate 12 is in a generally flat condition when not in use, as illustrated in FIGS. 1 and 2. In other embodiments, the flexible substrate 12 may have a non-flat formed configuration when not in use. However, regardless of its shape when not in use, the flexible substrate 12 is highly flexible and resilient (i.e., has elastic memory). After removing the flexible substrate 12 from an electronic device, as described below, the flexible substrate 12 will resiliently recover to its original shape, whether it is a flat original shape or formed original shape.

An elongated aperture 22 is formed in the substrate adjacent each end portion 14, 16. Each elongated aperture 22 extends along a direction that is substantially parallel with a respective end portion 14, 16 of the substrate when the apparatus 10 is not in use (i.e., in the flat, non-use configuration), as illustrated. For example, an elongated aperture 22 adjacent substrate end portion 16 (FIG. 2) is shown extending along direction $A_1$. End portion 16 has an elongated configuration that extends along direction $A_2$. $A_1$ and $A_2$ are substantially parallel.

In the illustrated embodiment, the substrate 12, when the apparatus 10 is not in use (i.e., in the flat, non-use configuration), has a generally hour-glass configuration. The hour-glass configuration can help the substrate 12 conform to the surface contour of an electronic device when installed thereon. However, in other embodiments of the present invention, substrate 12 may have various configurations and shapes, without limitation. Moreover, substrate 12 may have a non-flat shape when not in use (e.g., a formed shape).

The substrate 12 is formed from an elastomeric material, such as a natural polymeric material and/or a synthetic polymeric material. Moreover, the substrate 12 is made sufficiently flexible to conform to the various shapes and contours of an electronic device to which it is configured to be removably secured, as will be described below.

In some embodiments, one or both substrate surfaces 18, 20 may have a tactile configuration that facilitates gripping by a user. As such, the apparatus 10 can also serve the purpose of helping a user hold an electronic device and prevent slippage thereof, etc.

In some embodiments, the substrate 12 is a composite of two or more layers of flexible, resilient material. Moreover, one of the two or more layers may comprise a resilient, deformable material, such as a foam material, gel material, etc. For example, a first layer of foam or gel material may be sandwiched between second and third layers of a thin elastomeric material. Various combinations of materials and layers are possible, without limitation. In other embodiments, substrate 12 is a single layer of flexible, resilient material.

In some embodiments, one or both substrate surfaces 18, 20 may have printed indicia thereon. The printed indicia may relate to the function of the electronic device on which the battery restraint apparatus 10 is secured. For example, if the electronic device is a television remote control, the printed indicia may relate to television stations, programs, channels, etc. If the electronic device is a financial calculator, printed indicia may be financial in nature, etc. The printed indicia may also be promotional in nature (e.g., advertising, etc.). The term "printed indicia" includes all types of printed material including, but not limited to, text, lettering (i.e., alphabetical characters, alphanumeric characters), designs, characters, logos, images, graphics, symbols, etc. Moreover, printed indicia may be utilized virtually anywhere on the substrate 12.

In some embodiments, the substrate 12 may have one or more colors. Moreover, one or more portions of the substrate may be configured to glow in the dark (i.e., contain phosphorescent material), which can facilitate locating an electronic device to which the apparatus 10 is secured.

Referring to FIG. 3, the battery restraint apparatus 10 of FIGS. 1-2 is removably secured to an electronic device 30, such as a television remote control. The electronic device 30 includes a housing 32 and a battery compartment 34 within the housing 32. The battery compartment 34 has an opening 36 in a rear surface 32a of the housing 32. As would be understood by one skilled in the art of the present invention, at least one battery 38 is disposed within the battery compartment 34 and is configured to provide power to the electronic device 30.

The battery restraint apparatus 10 is removably secured to the housing 32 so as to overlie the battery compartment opening 36 and retain batteries 38 disposed within the compartment 34. The battery restraint apparatus 10 serves the function of a battery compartment door. The battery restraint apparatus 10 may also overlie a battery compartment door, particularly one that is broken or that will not remain in place covering a battery compartment opening. Each end 30a, 30b of the electronic device 30 is inserted through a respective one of the elongated apertures 22. Alternatively, the apparatus 10 may be positioned by sliding one end of the electronic device 30 through both apertures 22, as would be understood by one skilled in the art. As illustrated, each aperture 22 is positioned close to a respective end portion 14, 16 of the substrate. As such, each end portion 14, 16 does not interfere with operation of buttons and controls on the front surface of the electronic device. For example, each end portion 14, 16 is sized and configured to fit between rows of buttons and/or controls and not hinder use of the electronic device 30.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A battery restraint apparatus, comprising a flexible, resilient substrate having opposite, elongated end portions, wherein an elongated aperture is formed in the substrate adjacent each end portion, and wherein each elongated aperture extends along a direction that is substantially parallel with a respective end portion of the substrate.

2. The apparatus of claim 1, wherein the substrate has an hour-glass configuration.

3. The apparatus of claim 1, wherein a surface of the substrate has a tactile configuration that facilitates gripping by a user.

4. The apparatus of claim 1, wherein the substrate is a composite of two or more layers of flexible material.

5. The apparatus of claim 1, wherein a surface of the substrate comprises printed indicia thereon.

6. The apparatus of claim 1, wherein a substrate comprises phosphorescent material.

7. The apparatus of claim 1, in combination with an electronic device, wherein the apparatus is removably secured to the electronic device.

8. The apparatus of claim 1, in combination with an electronic device, wherein the apparatus is removably secured to the electronic device, and wherein the electronic device is a remote control device.

9. An electronic device, comprising:
 a housing;
 a battery compartment within the housing and having an opening in a surface of the housing;
 at least one battery disposed within the battery compartment; and
 a battery restraint apparatus removably secured to the housing and having a portion snugly overlying the battery compartment opening, wherein the battery restraint apparatus comprises a flexible substrate having opposite, elongated end portions, wherein an elongated aperture is formed in the substrate adjacent each end portion, and wherein the housing extends through the elongated apertures.

10. The electronic device of claim 9, further comprising a keypad extending from a portion of the housing, and wherein at least one substrate end portion extends between keys in the keypad so as not to interfere with keypad operation.

* * * * *